(12) United States Patent
Foster

(10) Patent No.: US 10,519,950 B2
(45) Date of Patent: Dec. 31, 2019

(54) MODULAR GLAND ARRANGEMENTS FOR A FLUID END ASSEMBLY

(71) Applicant: Kerr Machine Co., Sulphur, OK (US)

(72) Inventor: Kelcy Jake Foster, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 102 days.

(21) Appl. No.: 15/685,167

(22) Filed: Aug. 24, 2017

(65) Prior Publication Data

US 2018/0058447 A1 Mar. 1, 2018

Related U.S. Application Data

(60) Provisional application No. 62/379,462, filed on Aug. 25, 2016.

(51) Int. Cl.
| | |
|---|---|
| *F04B 53/16* | (2006.01) |
| *F04B 53/22* | (2006.01) |
| *F16K 5/04* | (2006.01) |
| *E21B 43/26* | (2006.01) |
| *F04B 53/10* | (2006.01) |
| *E21B 43/12* | (2006.01) |

(52) U.S. Cl.
CPC ............. *F04B 53/16* (2013.01); *F04B 53/22* (2013.01); *F16K 5/0471* (2013.01); *F16K 5/0492* (2013.01); *E21B 43/12* (2013.01); *E21B 43/26* (2013.01); *F04B 53/10* (2013.01)

(58) Field of Classification Search
CPC ...................................................... F04B 53/16
See application file for complete search history.

(56) References Cited

U.S. PATENT DOCUMENTS

| | | | |
|---|---|---|---|
| 6,544,012 B1 * | 4/2003 | Blume ................. | F04B 53/007 277/370 |
| 6,910,871 B1 * | 6/2005 | Blume ................. | F04B 53/007 137/512 |
| 7,335,002 B2 * | 2/2008 | Vicars ................. | F04B 53/007 137/512 |
| 9,732,746 B2 | 8/2017 | Chandrasekaran et al. | |
| 2006/0002806 A1 * | 1/2006 | Baxter ................. | F04B 39/10 417/539 |

(Continued)

OTHER PUBLICATIONS

Exhibit "A" includes cross-sectional views of fluid end assemblies known in the art prior to Aug. 25, 2016.

(Continued)

*Primary Examiner* — Thomas E Lazo
(74) *Attorney, Agent, or Firm* — Tomlinson McKinstry, P.C.

(57) ABSTRACT

A closure element for a fluid end assembly that has two or more recessed grooves formed in its outer surface. The grooves are axially offset. A seal is placed in one and only one of the grooves. As wear occurs, the seal is relocated to one of the other grooves. Instead of a series of axially offset grooves in a single closure element, a kit may be formed from two or more otherwise identical closure elements, each with a single recessed groove at a different axial position. Another closure element has a series of ledge-like surfaces defining spaces within which a seal may be received. One outer surface surrounds one or more of the other surfaces. A seal is placed in one and only one of the spaces. As wear occurs, the seal is relocated to one of the other spaces.

22 Claims, 13 Drawing Sheets

(56) References Cited

U.S. PATENT DOCUMENTS

2011/0189040 A1* 8/2011 Vicars ................ F04B 53/00
  417/559

OTHER PUBLICATIONS

Exhibit "B" includes side views of valve seats known in the art prior to Sep. 29, 2015.
Exhibit "C" is a cross-sectional view of a plunger end of a fluid assembly known in the art prior to Sep. 29, 2015.
Exhibit "D" includes an engineering drawing and pictures of a mud pump known in the art prior to Sep. 29, 2015.

* cited by examiner

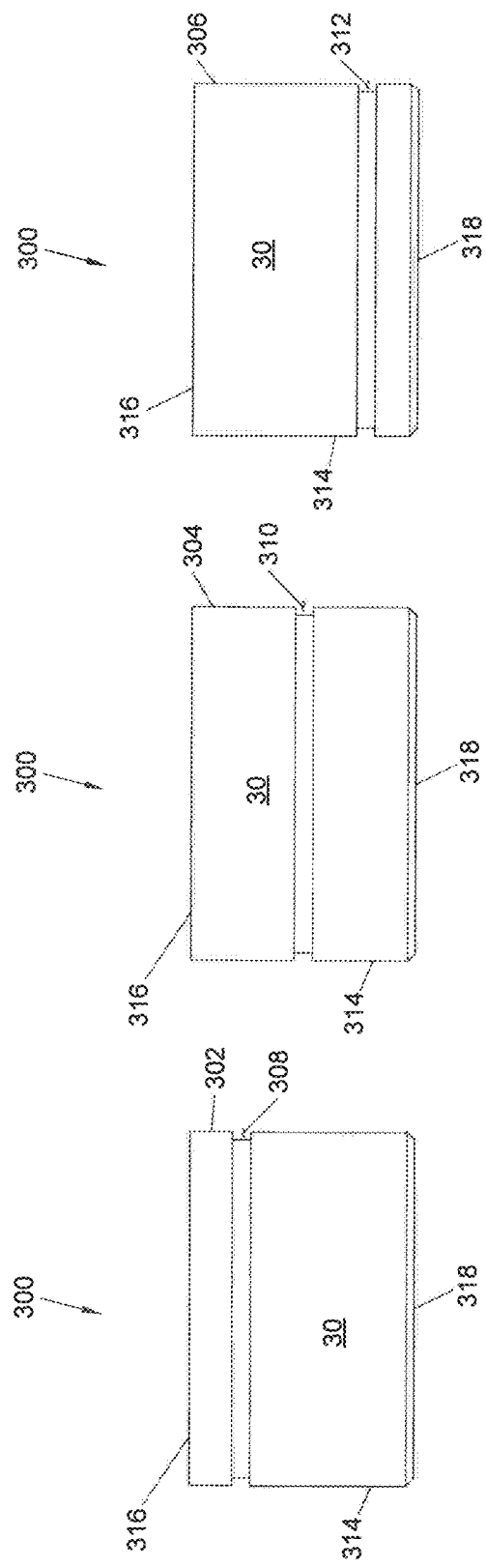

US 10,519,950 B2

MODULAR GLAND ARRANGEMENTS FOR A FLUID END ASSEMBLY

CROSS REFERENCE TO RELATED APPLICATION

This application claims the benefit of U.S. Provisional Application Ser. No. 62/379,462, filed Aug. 25, 2016, the entire contents of which are incorporated herein by reference.

SUMMARY

The present invention is directed to a kit comprising a fluid end assembly, a closure element, and at least one annular first seal. The fluid end assembly comprises a housing having an external surface and an internal chamber. A first conduit is formed in the housing that has a first and a second section, each section independently interconnecting the internal chamber and the external surface. A second conduit is also formed in the housing that intersects the first conduit and independently interconnects the internal chamber and the external surface. The closure element comprises a body having at least two structural features. Each structural feature comprises a pair of external surfaces formed in an outer surface of the body. The external surfaces join at a first corner line and form two boundaries of a recessed space within which an annular seal is receivable. The annular first seal is positionable within the recessed space of any of the structural features.

The present invention is also directed to a kit comprising a fluid end assembly, a first closure element, annular first seal, a second closure element, and an annular second seal. The fluid end assembly comprises a housing having an internal chamber and a conduit that intersects the internal chamber and opens at a first surface of the housing. The first closure element comprises a body having a pair of external surfaces formed in an outer surface of the body. The external surfaces join at a first corner line and form two boundaries of a recessed space within which an annular seal is receivable. The annular first seal is positioned within the recessed space of the first closure element. The second closure element comprises a body having a pair of external surfaces formed in an outer surface of the body. The external surfaces join at a first corner line and form two boundaries of a recessed space within which an annular seal is receivable. The recessed space of the second closure element is axially offset from the recessed space of the first closure element if those closure elements were superimposed. The annular second seal is positioned within the recessed space of the second closure element.

BRIEF DESCRIPTION OF THE DRAWINGS

FIG. 11 is a side elevation of a first discharge cover. Together with the second and third discharge covers shown in FIGS. 12 and 13, it forms a kit of a third embodiment of discharge covers.

FIG. 12 is a side elevation view of a second discharge cover.

FIG. 13 is a side elevation view of a third discharge cover.

DETAILED DESCRIPTION

Fluid end assemblies are typically used in oil and gas operations to deliver highly pressurized corrosive and/or abrasive fluids to piping leading to the wellbore. The assemblies are typically attached to power ends run by engines. The power ends reciprocate plungers within the assemblies to pump fluid throughout the fluid end. Fluid may be pumped through the fluid end at pressures that range from 5,000-15,000 pounds per square inch (psi). Fluid used in high pressure hydraulic fracturing operations is typically pumped through the fluid end at a minimum of 8,000 psi; however, fluid will normally be pumped through the fluid end at pressures around 10,000-15,000 psi during such operations.

Figure 1:
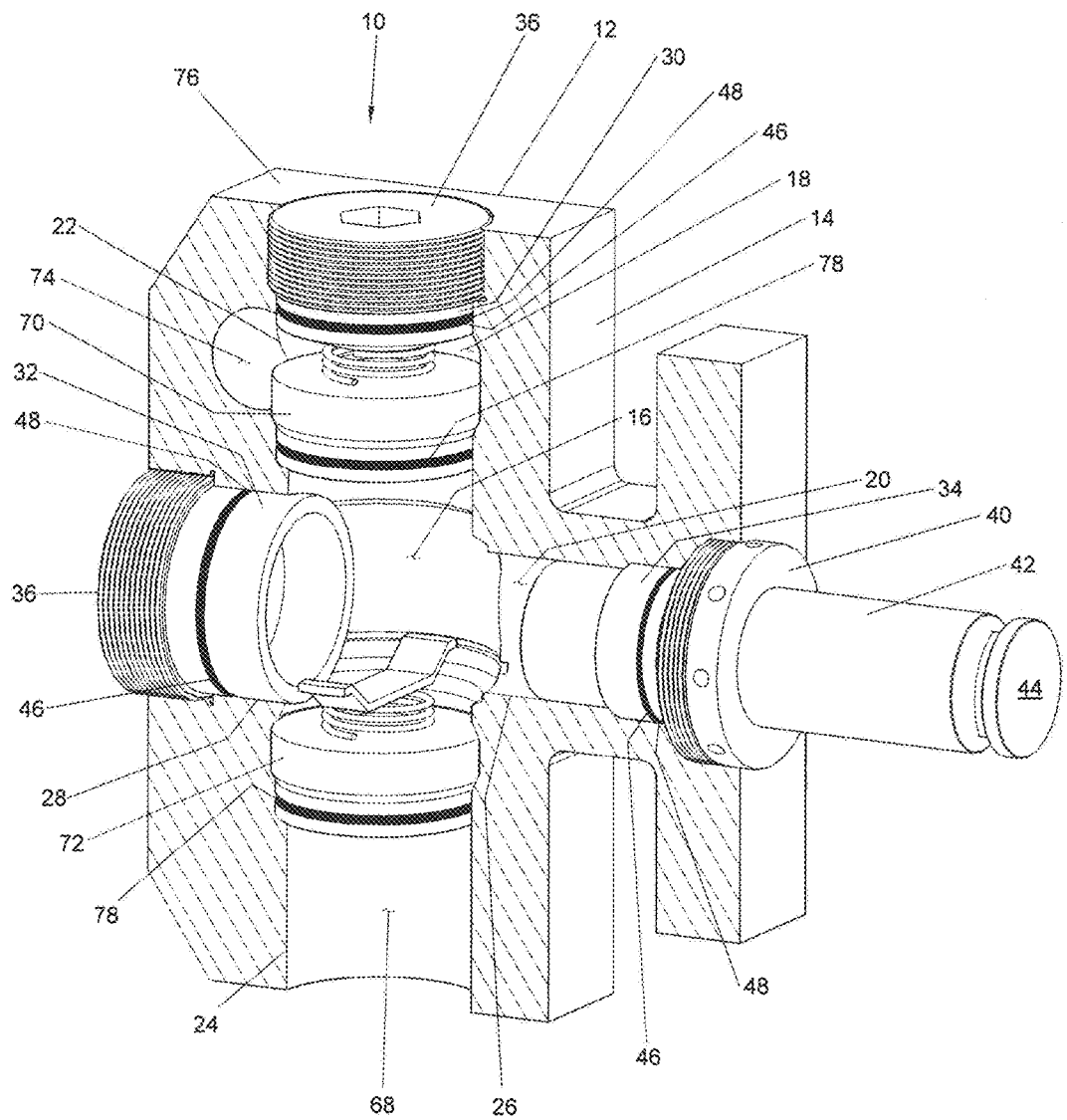
FIG. 1 is a perspective view of a fluid end assembly. The housing has been partially cut away to better display installed closure elements.

With reference now to FIG. 1, a fluid end assembly to comprising a housing 12 having an external surface 14 and an internal chamber 16 is shown. A first conduit 18 and a second conduit 20 are formed within the housing 12. The conduits 18 and 20 intersect each other to form the internal chamber 16. As shown in FIG. 1, the diameter of the conduits 18 and 20 may vary throughout the housing 12. This allows the conduits 18 and 20 to closely receive structures of different sizes described later herein.

The first conduit 18 shown in FIG. 1 has aligned first and second sections 22 and 24, and the second conduit 20 has aligned third and fourth sections 26 and 28. Each section 22, 24, 26, and 28 independently connects the internal chamber 16 and the external surface 14. The sections 22, 24, 26, and 28 are aligned such that the conduits 18 and 20 are orthogonal to one another. However, the sections 22, 24, 26, and 28 may also be aligned so they intersect the internal chamber 16 at a non-straight angle.

In another embodiment, the second conduit 20 may only comprise a third section 26, meaning the second conduit 20 only has one opening on the external surface 14. The fourth section 28 is not required for operation of the fluid end 10. The fourth section 28 is typically machined in the housing 12 for ease of creating the second conduit 20 and to provide an opening to service parts within the housing 12, if needed.

The second section 24 has an intake opening 68. The intake opening 68 may be secured to a piping system that delivers fluid to the fluid end 10. A set of valves 70 and 72 are positioned within the first conduit 18. The valves 70 and 72 help move fluid within the housing 12. An intake valve 72 prevents fluid from flowing back through the intake opening 68 after entering the housing 12. A discharge valve 70 allows fluid to exit the fluid end 10 through a discharge opening 74 positioned proximate a top end 76 of the fluid end 10. Each of the valves 70, 72 may also have a seal 78 positioned around its outer surface to block fluid from leaking around the valves 70, 72.

Figure 8:
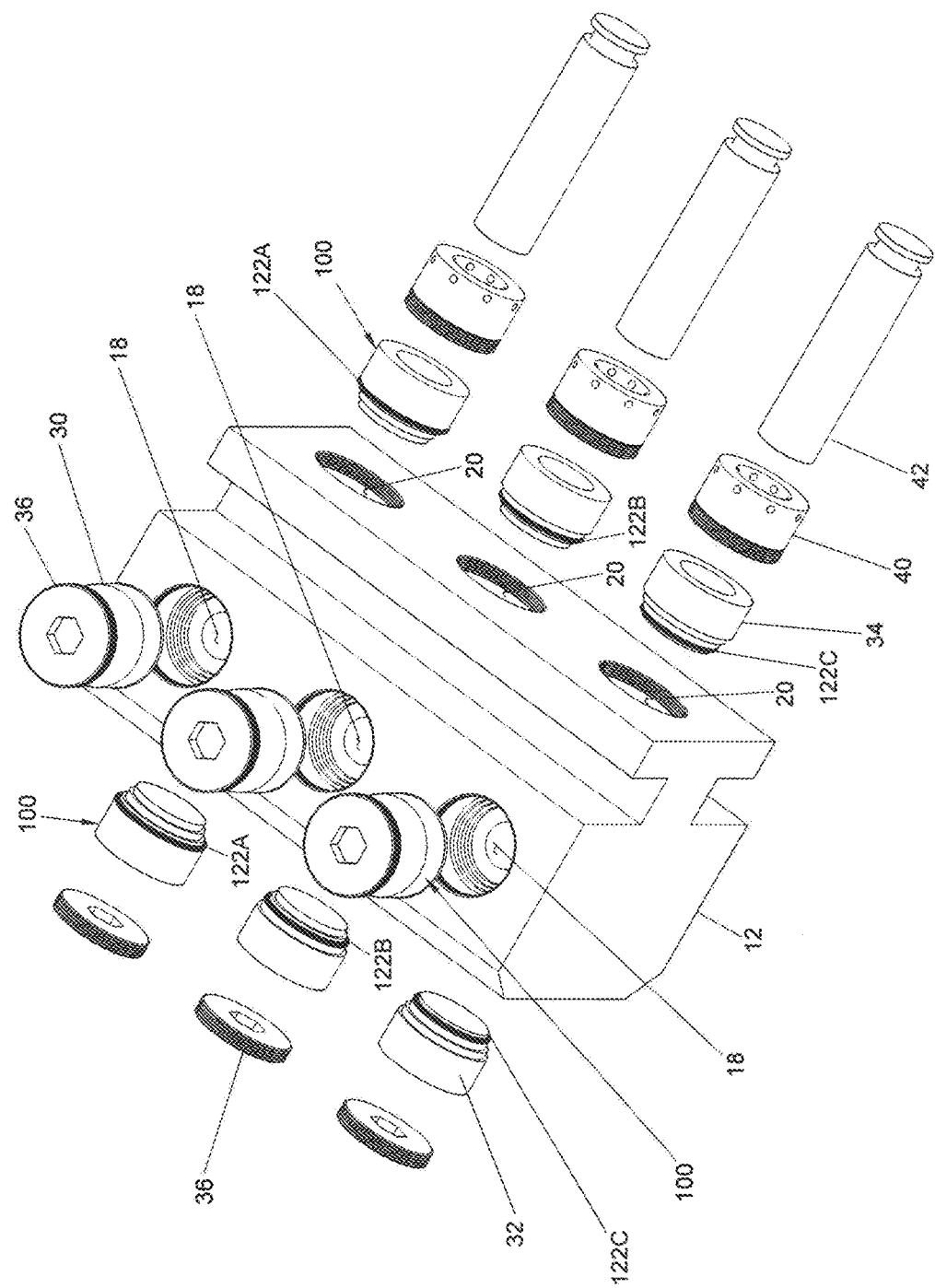
FIG. 8 is an exploded perspective view of components of the fluid end assembly. The discharge covers are those shown in FIG. 2, and the sleeves are those shown in FIG. 4.

With reference to FIGS. 1 and 8, the housing 12 may have a plurality of first and second conduits 18 and 20 positioned adjacent one another. Each first conduit 18 may have an intake opening 68 formed in its second section 24. The intake openings 68 may each be connected to a different coupler or pipe that leads to the same piping system (not shown). This allows fluid to enter the fluid end 10 through multiple openings. In contrast, only one discharge opening 74 may be formed in the housing 12. Each first section 22 of the first conduits 18 may be connected to the discharge opening 74. This allows fluid to exit the housing 12 through a single opening.

A second discharge opening (not shown) may also be formed in the housing 12 that is in fluid communication with the discharge opening 74. This allows fluid to exit the housing 12 through two openings. Additional discharge openings may also be formed in the housing 12, if needed.

With reference to FIG. 1, a plurality of closure elements 30, 32, and 34 are shown positioned within the first, third, and fourth sections 22, 26, and 28. The closure element positioned within the first section 22 is a discharge cover or discharge plug 30, and the closure element positioned within the fourth section 28 is a suction cover or suction plug 32. The covers 30 and 32 are substantially identical. Each cover 30, 32 is sized to fully block fluid flow within the section 22 or 28 it is situated in. The covers 30 and 32 are retained within each section 22 or 28 by a retaining nut 36 that threads into each section 22 and 28 proximate the external surface 14 of the housing 12.

The closure element positioned within the third section 26 is a sleeve 34. The sleeve 34 is tubular and sized to be closely received within the third section 26. The sleeve 34 is retained within the third section 26 by a tubular retaining nut 40. The retaining nut 40 threads into the third section 26 proximate the external surface 14 of the housing 12.

A plunger 42 is shown disposed within the sleeve 34 and the retaining nut 40. During operation, the plunger 42 reciprocates within the housing 12 to pump fluid throughout the fluid end 10. The plunger 42 is powered by a power end run by an engine (not shown) that is connected to a first end 44 of the plunger 42.

Each of the closure elements 30, 32, and 34 has a seal 46 positioned around its outer surface to block fluid from leaking from the sections 22, 26, or 28. The seals 46 block the flow of fluid by tightly engaging an inner surface or sealing surface 48 of conduits 18 and 20.

Fluid end assemblies to are susceptible to corrosive and/or abrasive fluid becoming trapped between the seal 46 and the sealing surface 48. This may cause the sealing surfaces 48 to erode over time and prevent the seals 46 from tightly engaging the sealing surfaces 48. Fluid may leak from the sections 22, 26, and 28 if the seals 46 cannot effectively seal against the sealing surfaces 48. If fluid leaks from the fluid end 10, the housing 12 will likely need to be replaced, because it may no longer maintain the requisite fluid pressure for operation.

The present invention is directed to a system including one or more closure elements 30, 32, and 34 that permit the seal 46 to be relocated within the conduits 18 and 20 over time. Relocating the seal 46 also relocates the sealing surface 48. Thus, if the original sealing surface 48 suffers erosion, the seal 46 can be moved to engage with a different sealing surface 48 in the conduits 18 or 20. Such relocation will help extend the life of the fluid end housing 12.

Figure 2:
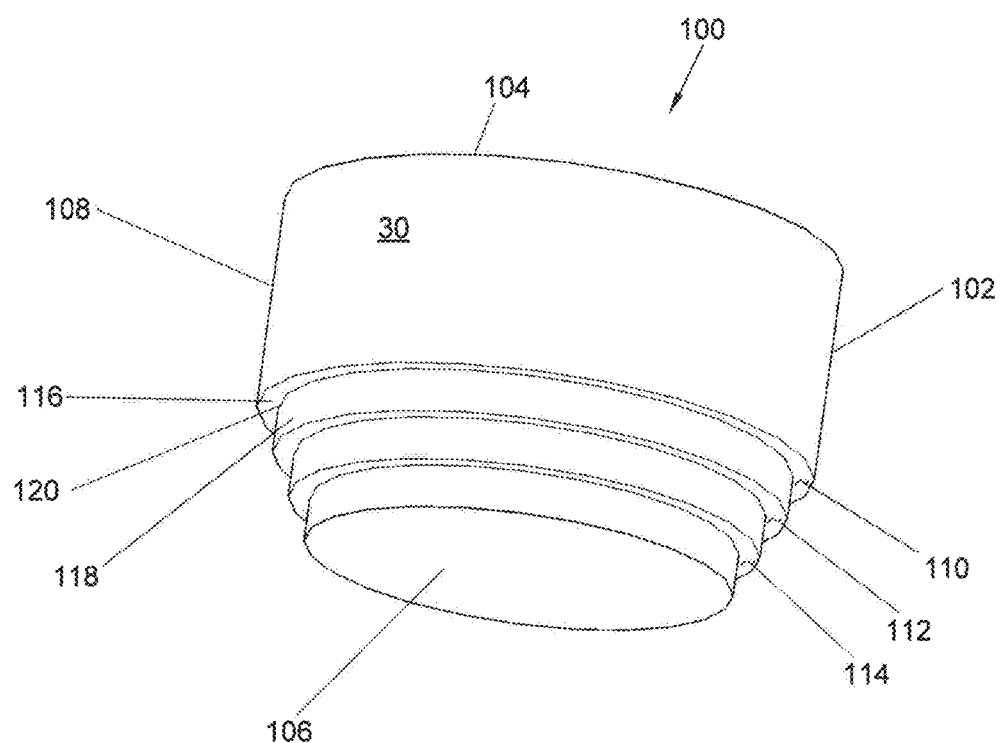
FIG. 2 is a perspective view of a discharge cover from the fluid end assembly of FIG. 1.
Figure 4:
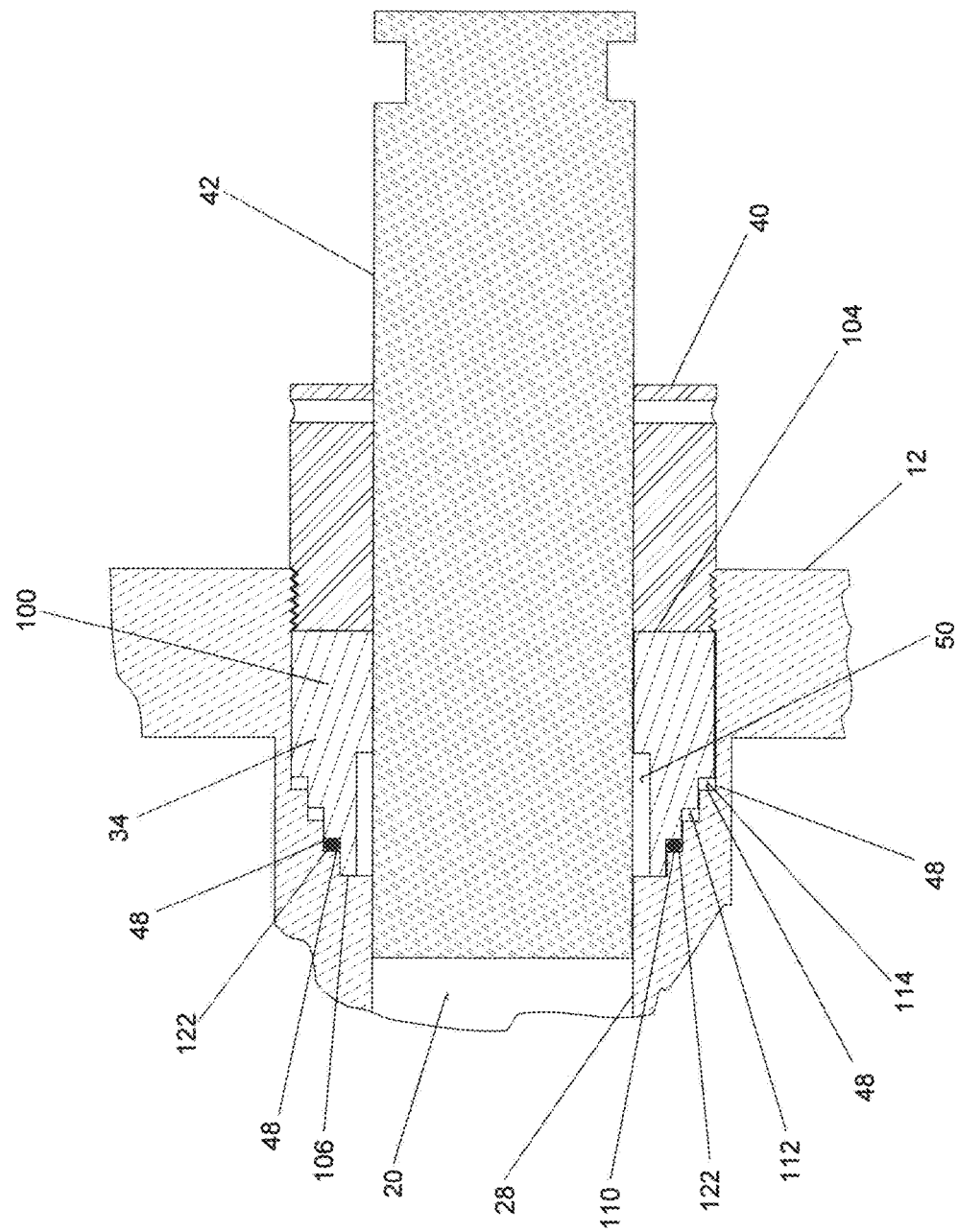
FIG. 4 is a cross-sectional view of a sleeve positioned within a conduit of the fluid end assembly. A plunger is disposed within the sleeve.

Turning now to FIG. 2, a first embodiment of the closure element 100 is shown. A discharge cover 30 is shown in FIG. 2, but a suction cover 32 or a sleeve 34 may also be used with the closure element 100 (FIGS. 4 and 8). The closure element 100 comprises a body 102 having a top surface 104, a bottom surface 106 and an outer surface 108.

The body 102 further comprises a plurality of structural features making up a first recessed space 110, a second recessed space 112, and third recessed space 114. The recessed spaces 110, 112, and 114 are each formed by paired external surfaces 116 and 118 that join at a first corner line 120 and form a ledge at an outer edge of the body 102. The external surfaces 116 and 118 form the boundaries of each recessed space 110, 112, and 114. An annular seal 122 is positionable within one of the recessed spaces 110, 112, and 114 (FIGS. 3 and 4).

The first recessed space 110 has a larger circumference than the second recessed space 112, and the second recessed space 112 has a larger circumference than the third recessed space 114. The structural features making up the recessed spaces 110, 112, and 114 shown in FIG. 2 follow substantially the same path around the outer surface 108 of the body 102. However, the recessed spaces 110, 112, and 114 may follow differently shaped paths around the outer surface 108 of the body 102, if desired.

Figure 3:
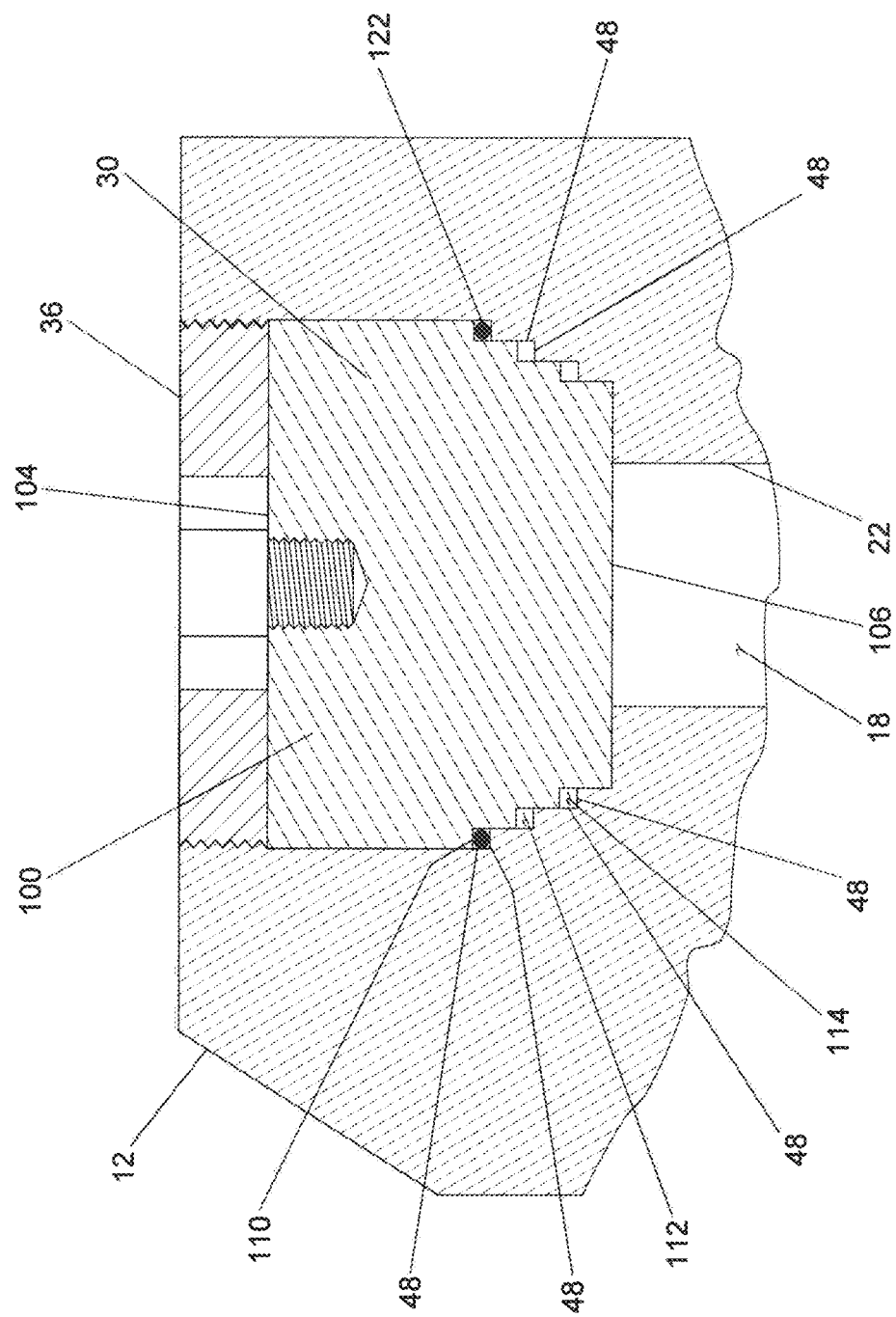
FIG. 3 is a cross-sectional view of the discharge cover of FIG. 2, positioned within a conduit of a fluid end assembly.

With reference now to FIGS. 3 and 4, the closure elements 100 are shown positioned within the conduits 18 and 20. The discharge cover 30 is shown in FIG. 3 and the sleeve 34 is shown in FIG. 4. The closure elements 100 are positioned within the sections 22 or 28 such that the bottom surface 106 faces towards the internal chamber 16 (FIG. 1). The retaining nut 36 or 40 is positioned above the top surface 104 of the closure element 100. As shown in FIG. 4, the sleeve 34 is hollow in the center to make room for the plunger 42. A packing seal or series of packing seals 50 may also be positioned inside of the sleeve 34 to block fluid from leaking between the sleeve 34 and the plunger 42.

Continuing with FIGS. 3 and 4, the sealing surface 48 for each seal 122 comprises paired surfaces formed in the internal walls of the conduits 18 or 20. The paired surfaces correspond with the recessed spaces 110, 112, and 114 formed in the closure element 100. Thus, the inner walls of the conduits 18 or 20 further bound the recessed spaces 110, 112, and 114 to tightly engage the seal 122.

Figure 5:
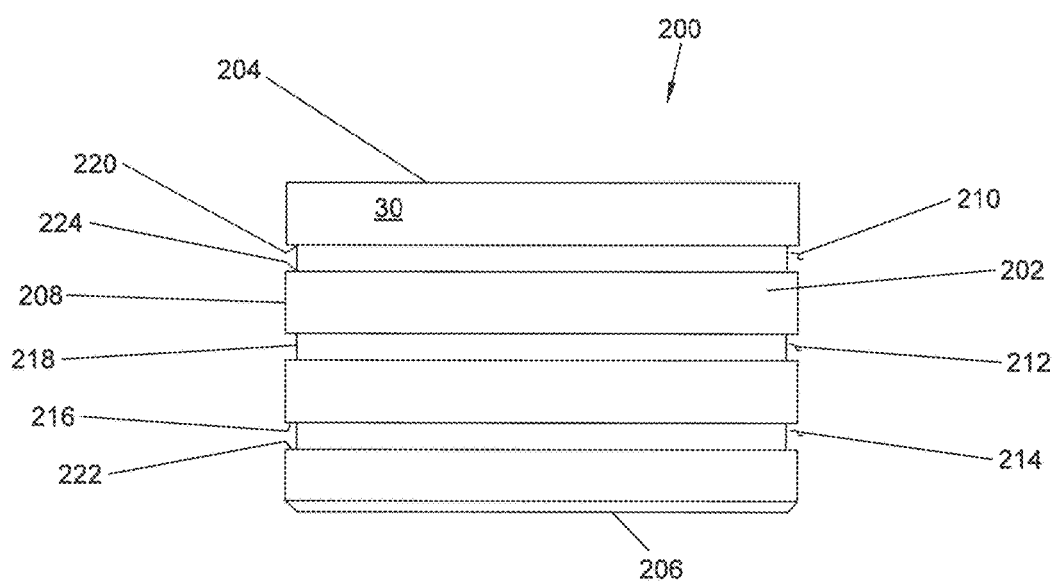
FIG. 5 is a side elevation view of a second embodiment of a discharge cover.
Figure 7:
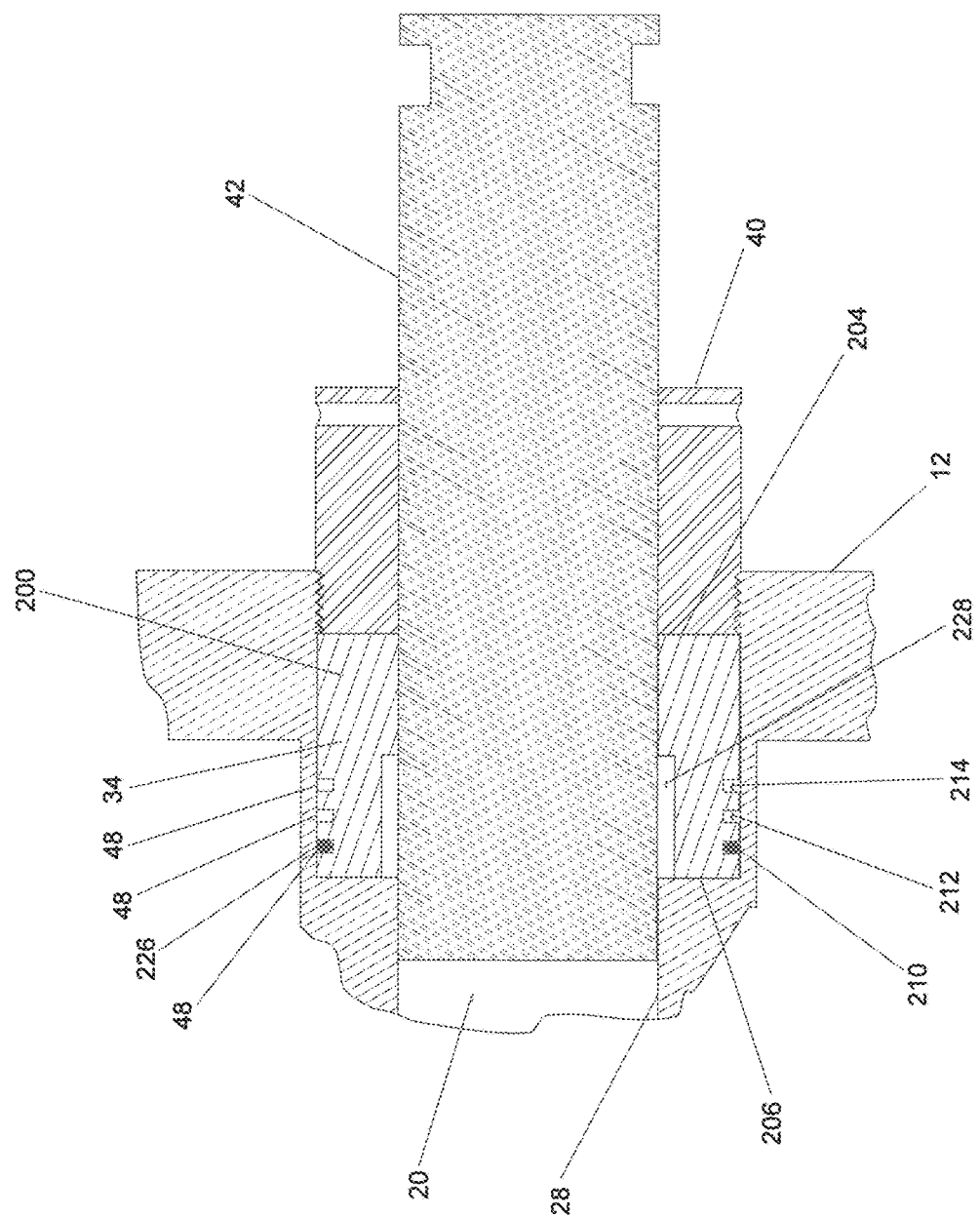
FIG. 7 is a cross-sectional view of a second embodiment of a sleeve positioned within a conduit of a fluid end assembly. A plunger is shown disposed within the sleeve.
Figure 9:
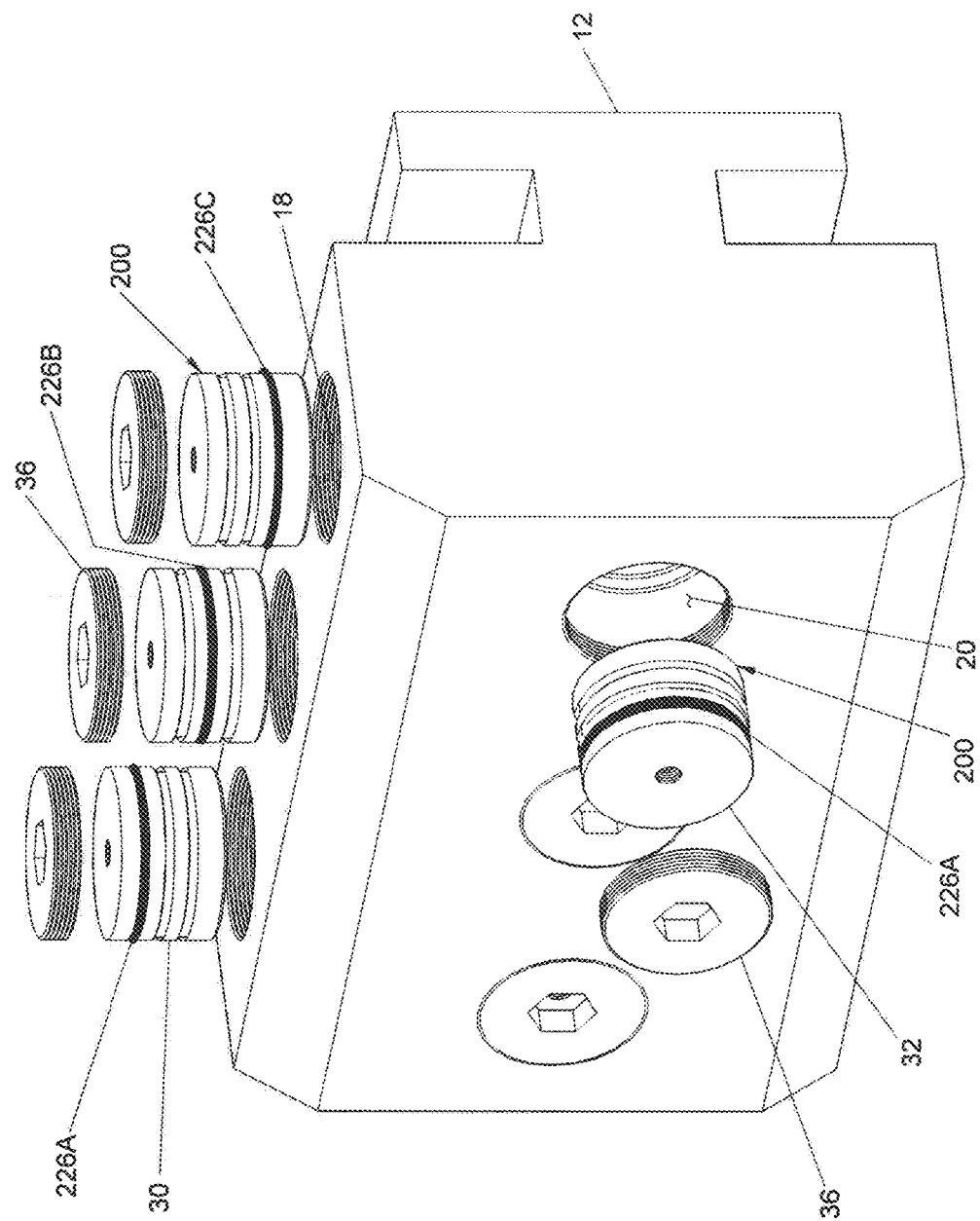
FIG. 9 is an exploded perspective view of some of the components of another fluid end assembly. The discharge covers are those shown in FIG. 5.
Figure 10:
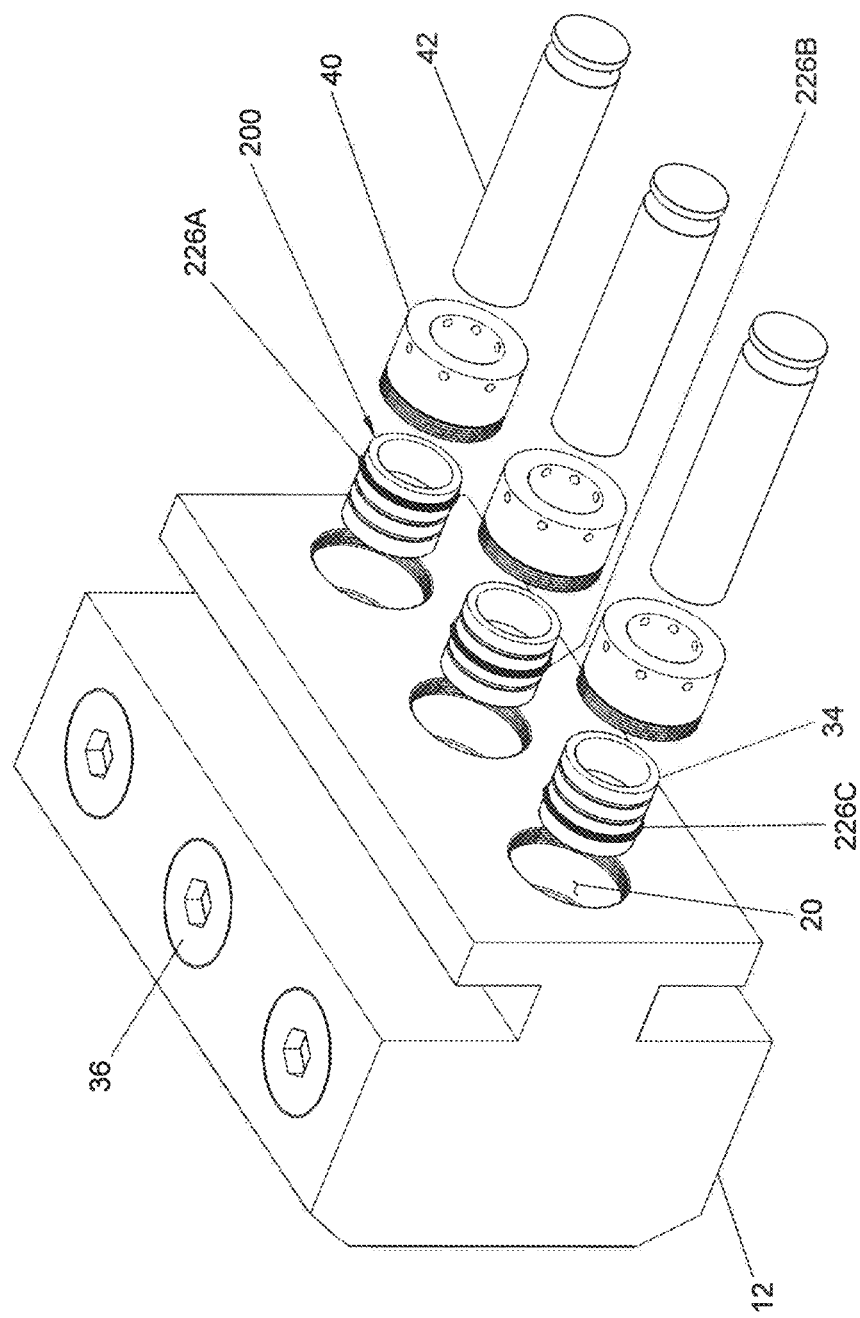
FIG. 10 is an exploded view of the fluid end assembly of FIG. 9, from a different perspective. The sleeves are those shown in FIG. 7.

Turning now to FIG. 5, a second embodiment of the closure element 200 is shown. A discharge cover 30 is shown in FIG. 5, but a suction cover 32 or a sleeve 34 may also be used with the closure element 200 (FIGS. 7, 9, and 10). The closure element 200 comprises a body 202 having a top surface 204, a bottom surface 206 and an outer surface 208.

A plurality of structural features are formed in the body 202 that make up a first recessed space 210, a second recessed space 212, and third recessed space 214. The recessed spaces 210, 212, and 214 are each formed by paired external surfaces 216 and 218 that join at a first corner line 220 and form a ledge at an outer edge of the body 202. The recessed spaces 210, 212, and 214 are further bounded by a third external surface 222 of the body 202 that joins one of the paired external surfaces 216, 218 at a second corner line 224. The three external surfaces 216, 218, and 222 together form a groove in the body 202.

The recessed spaces 210, 212, and 214 are axially spaced on the outer surface 208 of the body 202 and are substantially identical in shape and size. However, the spaces 210, 212, and 214 may vary in size and shape, if desired. An annular seal 226 is positionable within one of the recessed spaces 210, 212, and 214 (FIGS. 6 and 7).

Figure 6:
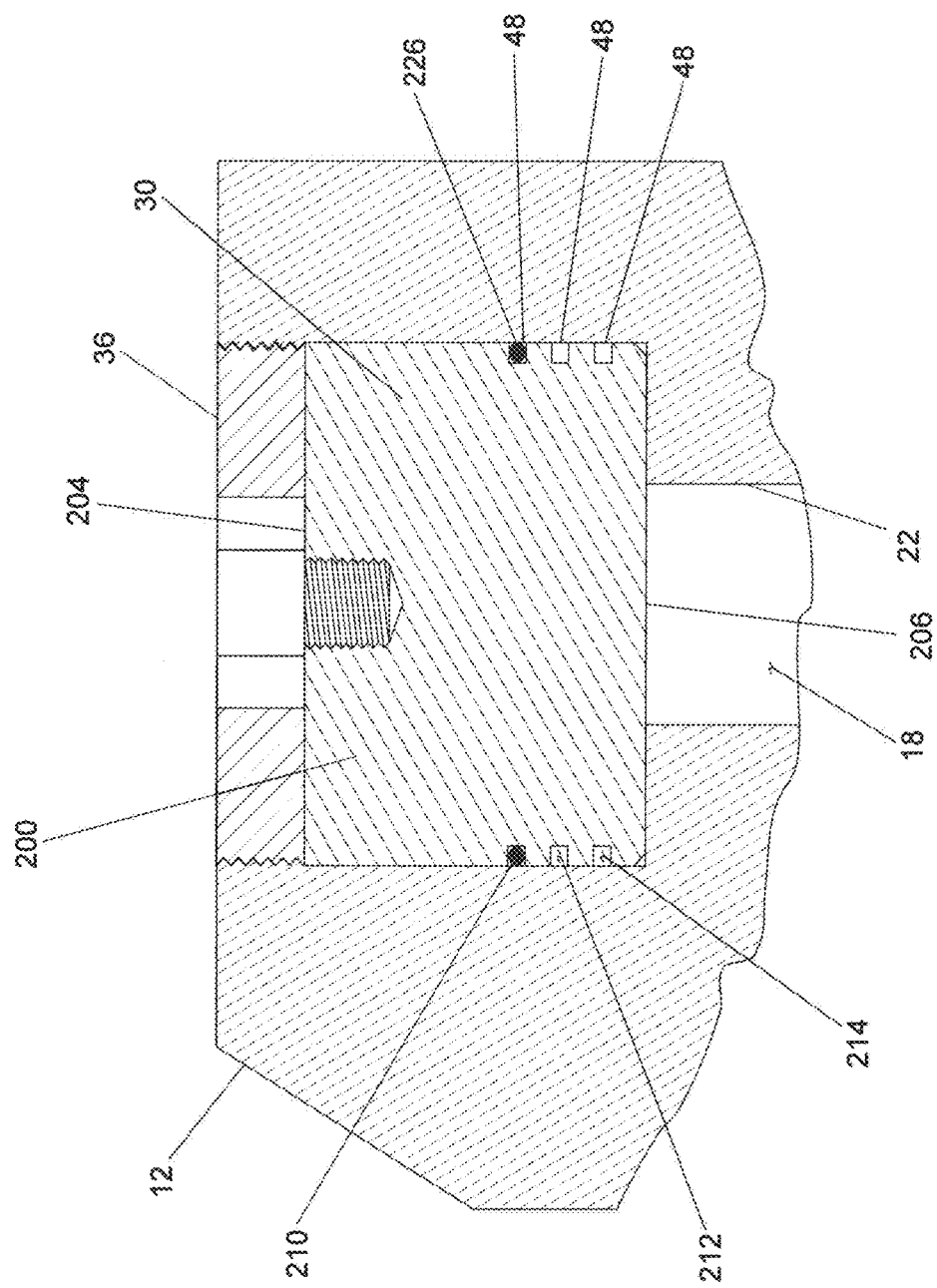
FIG. 6 is a cross-sectional view of the discharge cover of FIG. 5, positioned within a conduit of a fluid end assembly.

With reference now to FIGS. 6 and 7, the closure elements 200 are shown positioned within the conduits 18 and 20. The discharge cover 30 is shown in FIG. 6 and the sleeve 34 is shown in FIG. 7. The closure elements 200 are positioned within the sections 22 or 28 such that the bottom surface 206 faces towards the internal chamber 16 (FIG. 1). The retaining nut 36 or 40 is positioned above the top surface 204 of the closure element 200. As shown in FIG. 7, the sleeve 34 is hollow in the center to make room for the plunger 42. Like closure element 100, a packing seal or series of packing seals 228 may also be positioned inside of the sleeve 34 to block fluid from leaking between the sleeve 34 and the plunger 42.

Continuing with FIGS. 6 and 7, the sealing surface 48 for each seal 226 is the area of the internal wall of the conduit 18 or 20 that tightly engages the seal 226. This area is typically the portion of the internal wall directly across from the position of the seal 226, when the closure element 200 is positioned within the conduits 18 or 20.

Turning now to FIGS. 8-10, the first and second embodiments of the closure elements 100 and 200 may be utilized in the same manner. In operation, an operator will put a first seal 122A or 226A in the first recessed space 110 or 210 and leave the second and third recessed spaces 112, 212, 114, and 214 empty (FIGS. 2 and 5). The operator will then install the closure element 100 or 200 into one of the conduits 18 or 20 and secure it with the retaining nut 36 or 40.

The power end attached to the fluid end 10 is then activated such that fluid begins to flow throughout the fluid end 10. During operation, the sealing surface 48 within the conduit 18 or 20 will start to erode. If the seal 122A or 226A starts to leak, the power end is deactivated to stop fluid flow. The closure element 100 or 200 is removed from the conduit 18 or 20 and the first seal 122A or 226A is removed from the first recessed space 110 or 210 (FIGS. 2 and 5).

A second seal 122B or 226B is positioned within the second recessed space 112 or 212 leaving the first and third recessed spaces 110, 210, 114, and 214 empty (FIGS. 2 and 5). The closure element 100 or 200 is installed into the same conduit 18 or 20 it was removed from and operations may resume. Because the position of the second seal 122B or 226B is axially spaced from that of the first seal 122A or 226A, the second seal 122B or 226B will have a new non-eroded sealing surface 48 on the internal surface of the conduit 18 or 20 (FIGS. 3, 4, 6 and 7). Thus, the second seal 122B or 226B will offer enhanced resistance from leakage from the conduit 18 or 20.

As the sealing surfaces 48 experience erosion, the seal 122B or 226B may begin to leak. In such case, the power end is again deactivated and the closure element 100 or 200 is removed from the conduit 18 or 20, and the second seal 122B or 226B is removed from the second recessed space 112 or 212. A third seal 122C or 226C is positioned within the third recessed space 114 or 214 leaving the first and second recessed spaces 110, 210, 112, and 212 empty (FIGS. 2 and 5). The closure element 100 or 200 is again installed into the conduit 18 or 20 and operations may resume. Because the position of the third seal 122C or 226C is axially spaced from that of the first and second seal 122A, 122B, 226A, and 226B, the third seal 122C or 226C will have a new non-eroded sealing surface 48 (FIGS. 3, 4, 6, and 7). Thus, the third seal 122C or 226C will offer enhanced resistance from leakage from the conduit 18 or 20.

The operator may choose any order of positioning the seals within the grooves desired. The order of operation described above is non-limiting and is just one method of using the closure elements 100 or 200. For example, the operator may start by positioning the third seal 122C or 226C in the third recessed spaces 114 or 214, rather than starting by positioning the first seal 122A or 226A in the first recessed spaces 110 or 210.

The same methods described above may be employed using a closure element 100 or 200 having only two recessed spaces or having more than three recessed spaces. Once the final seal no longer seals properly against its sealing surface 48, the fluid end housing 12 will likely need to be replaced.

In operation, this method is employed for each conduit 18 or 20 individually. FIGS. 8-10 show the seals 122A, 122B, 122C, 226A, and 226C positioned within a different recessed space 110, 112, 114, 210, 212, and 214 (FIGS. 2 and 5) in each type of closure element 100 and 200 for illustrative purposes only. In reality, each closure element 100 or 200 starts with the first seal 122A or 226A in the first recessed space 110 or 210. The first seal 122A or 226A may be removed and the second seal 122B or 226B is placed in the second recessed space 112 or 212, and so on, only when necessary for each closure element 100 or 200.

Turning now to FIGS. 11-13, a third embodiment of the closure element 300 is shown. The closure element 300 utilizes a kit comprising multiple closure elements 302, 304, and 306. Discharge covers 30 are shown in FIGS. 11-13, but suction covers 32 or sleeves 34 may also be used with the closure element 300 (FIGS. 14 and 15).

The kit making up the closure element 300 includes a first closure element 302, a second closure element 304, and third closure element 306. Except as described hereafter, the closure elements 302, 304, and 306 are identical in size and shape to closure elements 200. Each closure element 302, 304, and 306 has a single structural feature formed in the outer surface of its body 314 in the form of a recessed space 308, 310, and 312. The recessed spaces 308, 310, and 312 are configured identically to the recessed spaces 210, 212, and 214 formed in the second embodiment of the closure element 200 (FIG. 5).

The first closure element 302 has a first recessed space 308 formed proximate a top surface 316 of its body 314. The second closure element 304 has a second recessed space 310 formed proximate the center of the body 314, and the third closure element 306 has a third recessed space 312 formed proximate a bottom surface 318 of its body 314. Thus, the recessed spaces 308, 310, and 312 are axially offset from one another if the closure elements 302, 304, and 306 are superimposed. A first, second, and third seal 320A, 320B, and 320C may be positioned within each corresponding recessed space 308, 310, and 312 (FIGS. 14 and 15).

Figure 14:
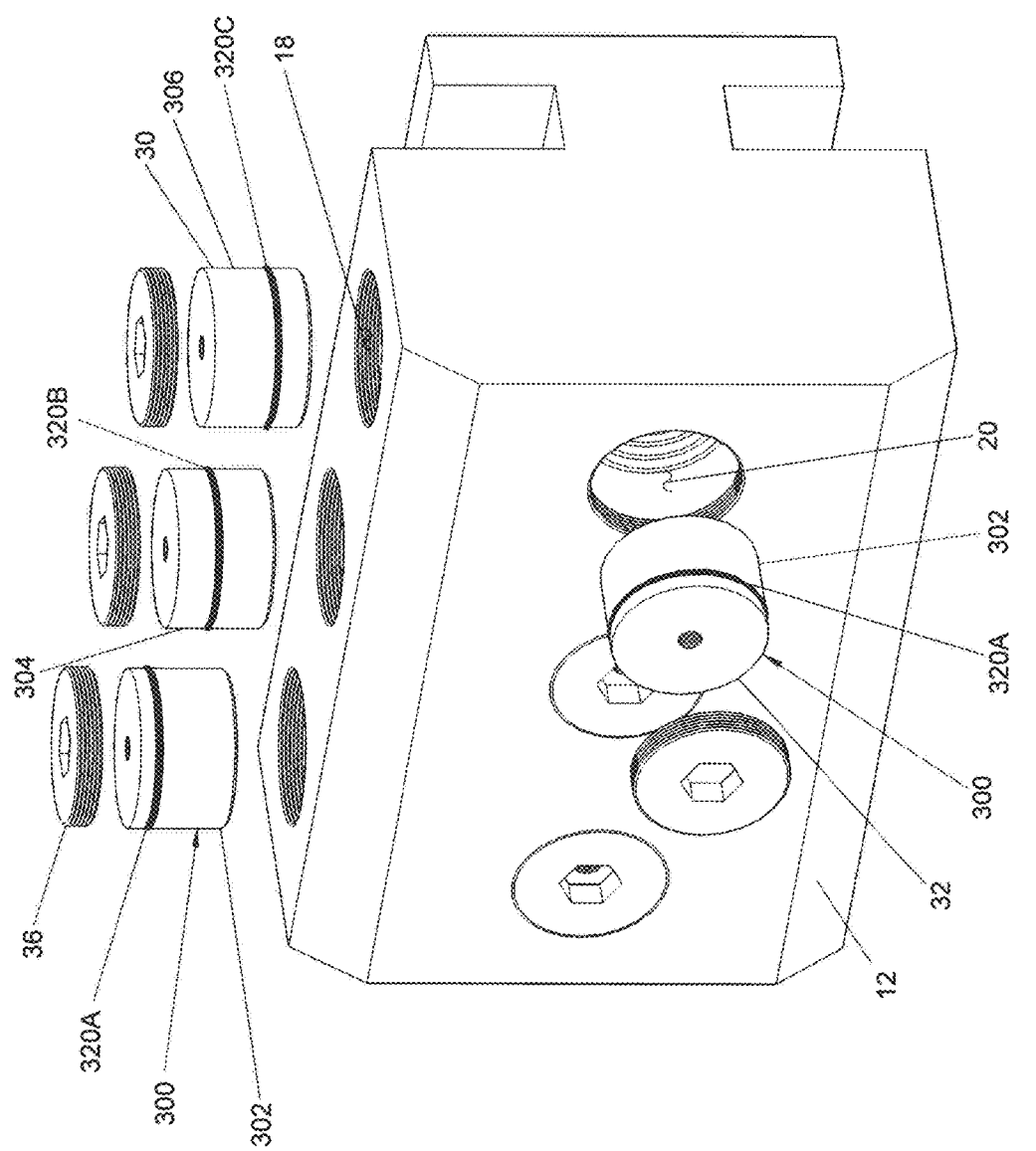
FIG. 14 is an exploded perspective view of some of the components of another fluid end assembly. The discharge covers are those shown in FIGS. 11-13.
Figure 15:
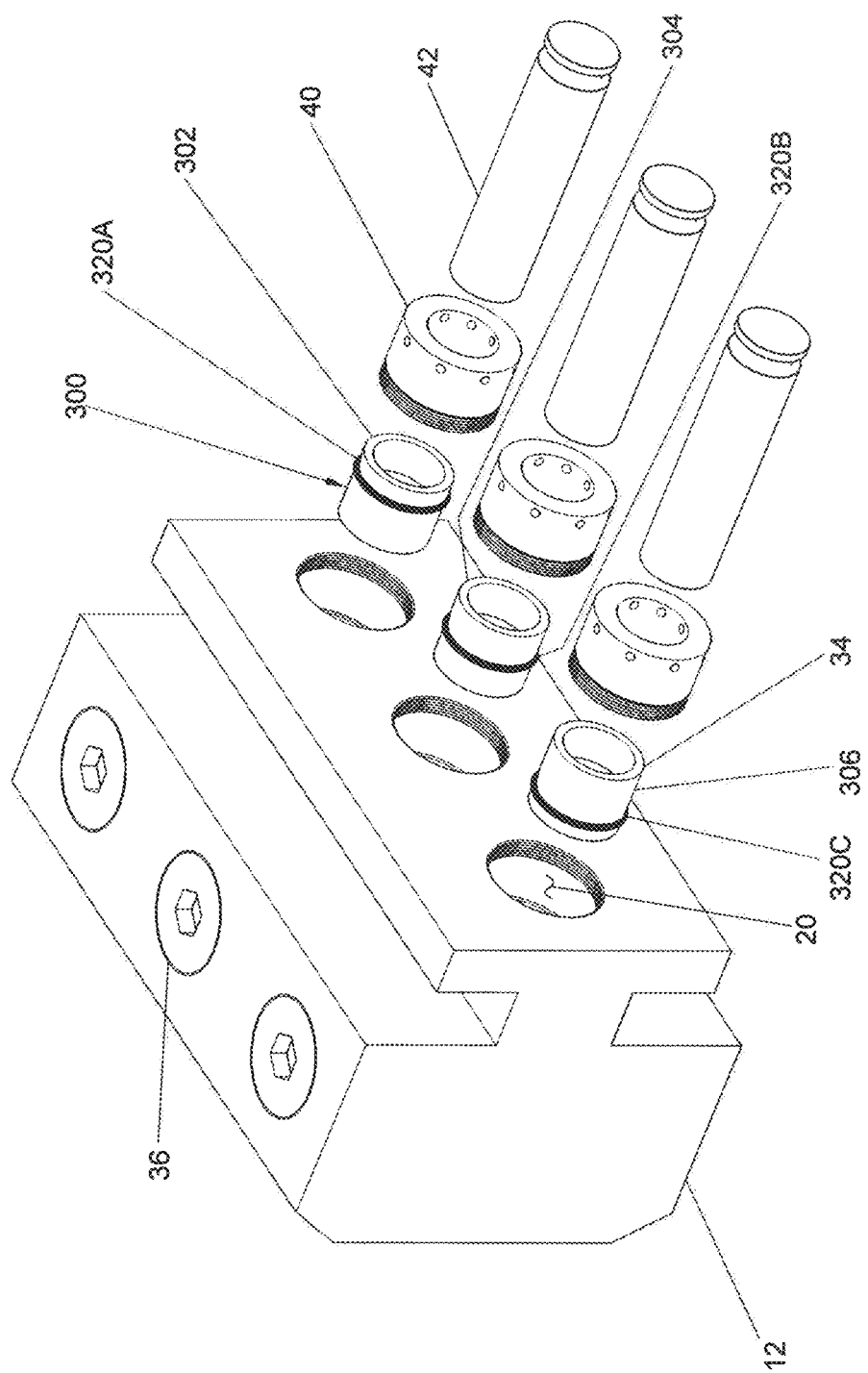
FIG. 15 is an exploded view of the fluid end assembly of FIG. 14, from a different perspective.

Turning now to FIGS. 14 and 15, in operation, the operator will install the first closure element 302 into one of the conduits 18 or 20 and secure it with the retaining nut 36 or 40. The power end attached to the fluid end 10 is activated such that fluid begins to flow throughout the fluid end 10. Over time, the sealing surface 48 of the first seal 320A will start to erode. If the first seal 320A starts to leak, the power end is deactivated to stop fluid flow. The first closure element 302 is removed from the conduit 18 or 20 and replaced with the second closure element 304.

Because the position of the second seal 320B on the second closure element 304 is axially spaced from that of the first seal 320A on the first closure element 302, the second seal 320B will have a new non-eroded sealing surface 48 in the conduit 18 or 20. Thus, the second seal 320B will offer enhanced resistance from leakage from the conduit 18 or 20.

As the sealing surfaces 48 experience erosion, the second seal 320B may begin to leak. In such case, the power end is again deactivated and the second closure element 304 is removed from the conduit 18 or 20 and replaced with the third closure element 306. Because the position of the third seal 320C on the third closure element 306 is axially spaced from the first and second seals 320A and 320B on the first and second closure elements 302 and 304, the third seal 320C will have a new non-eroded sealing surface 48. Thus, the third seal 320C will offer enhanced resistance from leakage from the conduit 18 or 20.

The operator may choose any order of positioning the closure element 302, 304, and 306 within the conduits 18 or 20 desired. The order of operation described above is non-limiting and is just one method of using the kit making up the closure element 300. For example, the operator may start by positioning the third closure element 306 in the conduit 18 or 20, rather than starting by positioning the first closure element 302 in the conduit 18 or 20.

This same method may be employed using only two different closure elements 300 or more than three different closure elements 300. Once the seal on the final closure element no longer seals properly, the fluid end housing 12 will likely need to be replaced.

This same method may also be employed using the first embodiment 100 of the closure element 100. In such case, each closure element would only have one recessed space formed in its body that is identical to the recessed spaces 110, 112, or 114 shown in FIG. 2. The recessed spaces would be axially offset if those closure elements were superimposed.

In operation, this method is employed for each conduit section 22, 26, or 28 (FIG. 1) individually. FIGS. 14 and 15 show a different closure element 302, 304, or 306 positioned within each conduit section 22, 26, or 28 for illustrative purposes only. In reality, each conduit section 22, 26, or 28 would start with the first closure element 302. The first closure element 302 would be removed and replaced with the second closure element 304, and so on, only when necessary for each conduit section 22, 26, or 28.

Turning back to FIG. 1, the seals 78 on the valves 70, 72 may have the same problems as the seals 46 used on the closure elements 30. Due to this, the embodiments 100, 200, and 300 and methods discussed above may also be employed on the valves 70 and 72.

Various modifications can be made in the design and operation of the present invention without departing from the spirit thereof. Thus, while the principle preferred construction and modes of operation of the invention have been explained in what is now considered to represent its best embodiments, which have been illustrated and described, it should be understood that the invention may be practiced otherwise than as specifically illustrated and described.

The invention claimed is:

1. A kit, comprising:
   a fluid end assembly comprising:
   a housing having an external surface and an internal chamber;
   a first conduit formed in the housing and having first and second sections, each section independently interconnecting the internal chamber and the external surface;
   a second conduit formed in the housing, intersecting the first conduit and independently interconnecting the internal chamber and the external surface;
   a closure element having a longitudinal axis extending therethrough and comprising:
   a body having at least two structural features, each structural feature comprising:
   a pair of external surfaces formed in an outer surface of the body, the external surfaces joining at a first corner line and forming two boundaries of a recessed space within which an annular seal is receivable;
   in which the at least two structural features include first and second structural features, and an axial footprint of the first structural feature fully surrounds an axial footprint of the second structural feature; and
   at least one annular first seal positionable within the recessed space of any of the structural features.

2. The kit of claim 1 in which each of the recessed spaces is further bounded by an internal surface of one of the conduits, when the closure element is positioned within one of the conduits.

3. The kit of claim 1 in which each structural feature forms a ledge at an outer edge of the outer surface of the body.

4. The kit of claim 1 in which the closure element is a plug that is sized to be closely received within one of the conduits.

5. The kit of claim 1 in which the closure element is a tubular sleeve sized to be closely received within one of the conduits.

6. The kit of claim 5 further comprising a plunger disposed at least partially within the sleeve.

7. The kit of claim 1 in which the at least two structural features follow differently shaped paths around the outer surface of the body.

8. The kit of claim 1 in which a seal is positioned within the recessed space of one and only one of the structural features of the closure element.

9. The kit of claim 8 in which the closure element is disposed within the first conduit of the fluid end assembly.

10. A method of using the kit of claim 1, comprising the following steps in this order:
    sealing the closure element such that the first seal occupies the recessed space of one of the structural features, and no seal occupies the recessed space of any other of the structural features;
    installing the sealed closure element within an externally-opening conduit of the fluid end assembly attached to a deactivated power end;
    actuating the power end such that a flow of fluid begins within the fluid end assembly;
    deactivating the power end such that the flow of fluid stops within the fluid end assembly;
    removing the first seal from the closure element;
    resealing the closure element such that a second seal occupies the recessed space of a structural feature not previously occupied by the first seal, and no seal occupies the recessed space of any other of the structural features; and
    installing the sealed closure element within the same externally-opening conduit of the fluid end assembly.

11. A kit comprising:
a fluid end assembly comprising:
   a housing having an internal chamber and a conduit that intersects the internal chamber and opens at a first surface of the housing;
a first closure element comprising a body having one and only one circumferential groove formed in an outer surface of the body, in which an annular seal is receivable within the groove;
an annular first seal positionable within the groove of the first closure element;
a second closure element comprising a body having one and only one circumferential groove formed in an outer surface of the body, in which an annular seal is receivable within the groove, and in which the grooves of the closure elements would be axially offset if those closure elements were superimposed; and
an annular second seal positionable within the groove of the second closure element.

12. The kit of claim 11 in which the first closure element is positioned within the conduit of the fluid end assembly with the first seal installed in its groove, and the second closure element is positioned outside of the fluid end assembly.

13. The kit of claim 11 in which the closure element is a plug that is sized to be closely received within the conduit.

14. The kit of claim 11 in which the closure element is a tubular sleeve sized to be closely received within the conduit.

15. The kit of claim 14 further comprising a plunger disposed at least partially within the sleeve.

16. The kit of claim 1 in which the pair of external surfaces comprises two and only two external surfaces.

17. A system, comprising:
the kit of claim 12; and
high pressure fluid positioned within at least a portion of the housing.

18. A kit, comprising:
a fluid end assembly comprising:
   a housing having an external surface and an internal chamber;
   a first conduit formed in the housing and having first and second sections, each section independently interconnecting the internal chamber and the external surface;
   a second conduit formed in the housing, intersecting the first conduit and independently interconnecting the internal chamber and the external surface;
a closure element comprising:
   a body having at least two structural features, each structural feature comprising:
      a pair of external surfaces formed in an outer surface of the body, the external surfaces joining at a first corner line and forming two boundaries of a recessed space within which an annular seal is receivable; and
at least one annular first seal positionable within the recessed space of any of the structural features; in which a seal is positioned within the recessed space of one and only one of the structural features of the closure element.

19. The kit of claim 18 in which at least one of the structural features further comprises:
a third external surface that joins one of the paired external surfaces at a second corner line and forms another boundary of the recessed space.

20. The kit of claim 19 in which the three external surfaces of at least one of the structural elements forms a groove within the body.

21. A method of using a kit, the kit comprising:
a fluid end assembly comprising:
   a housing having an external surface and an internal chamber;
   a first conduit formed in the housing and having first and second sections, each section independently interconnecting the internal chamber and the external surface;
   a second conduit formed in the housing, intersecting the first conduit and independently interconnecting the internal chamber and the external surface;
a closure element comprising:
   a body having at least two structural features, each structural feature comprising:
      a pair of external surfaces formed in an outer surface of the body, the external surfaces joining at a first corner line and forming two boundaries of a recessed space within which an annular seal is receivable; and
at least one annular first seal positionable within the recessed space of any of the structural features;
the method comprising the following steps in this order:
sealing the closure element such that the first seal occupies the recessed space of one of the structural features, and no seal occupies the recessed space of any other of the structural features;
installing the sealed closure element within an externally-opening conduit of the fluid end assembly attached to a deactivated power end;
actuating the power end such that a flow of fluid begins within the fluid end assembly;
deactivating the power end such that the flow of fluid stops within the fluid end assembly;
removing the first seal from the closure element;
resealing the closure element such that a second seal occupies the recessed space of a structural feature not previously occupied by the first seal, and no seal occupies the recessed space of any other of the structural features; and
installing the sealed closure element within the same externally-opening conduit of the fluid end assembly.

22. A kit comprising:
a fluid end assembly comprising:
   a housing having an internal chamber and a conduit that intersects the internal chamber and opens at a first surface of the housing;
a first closure element comprising a body having a pair of external surfaces formed in an outer surface of the body, the external surfaces joining at a first corner line and forming two boundaries of a recessed space within which an annular seal is receivable;
an annular first seal positionable within the recessed space of the first closure element;
a second closure element comprising a body having a pair of external surfaces formed in an outer surface of the body, the external surfaces joining at a first corner line and forming two boundaries of a recessed space within which an annular seal is receivable, in which the recessed spaces of the closure elements would be axially offset if those closure elements were superimposed; and
an annular second seal positionable within the recessed space of the second closure element;

in which each of the closure elements is a tubular sleeve sized to be closely received within the conduit.

* * * * *

UNITED STATES PATENT AND TRADEMARK OFFICE
CERTIFICATE OF CORRECTION

PATENT NO. : 10,519,950 B2  
APPLICATION NO. : 15/685167  
DATED : December 31, 2019  
INVENTOR(S) : Kelcy Jake Foster Page 1 of 1

It is certified that error appears in the above-identified patent and that said Letters Patent is hereby corrected as shown below:

In the Specification

Column 2, Line 43, please delete "to" and substitute therefore "10".
Column 3, Line 61, please delete the first occurrence of "to" and substitute therefore "10".

Signed and Sealed this  
Fourth Day of February, 2020

Andrei Iancu  
*Director of the United States Patent and Trademark Office*